United States Patent
Andre et al.

(10) Patent No.: US 8,146,512 B2
(45) Date of Patent: Apr. 3, 2012

(54) ANTI-EXTRACTION SAFETY DEVICE FOR A GUIDANCE SET COMPRISING TWO INCLINED ROLLERS ROLLING ON A RAIL

(75) Inventors: Jean-Luc Andre, Molsheim (FR); Franck Lamanna, Romanswiller (FR)

(73) Assignee: Lohr Industrie, Hangenbieten (FR)

( * ) Notice: Subject to any disclaimer, the term of this patent is extended or adjusted under 35 U.S.C. 154(b) by 208 days.

(21) Appl. No.: 12/520,578

(22) PCT Filed: Dec. 12, 2007

(86) PCT No.: PCT/FR2007/002047
§ 371 (c)(1),
(2), (4) Date: Jul. 30, 2009

(87) PCT Pub. No.: WO2008/087286
PCT Pub. Date: Jul. 24, 2008

(65) Prior Publication Data
US 2010/0071582 A1   Mar. 25, 2010

(30) Foreign Application Priority Data

Dec. 22, 2006   (FR) ..................................... 06 11296

(51) Int. Cl.
*B61F 9/00* (2006.01)
(52) U.S. Cl. ....................................... 104/244; 104/245
(58) Field of Classification Search ................. 104/244, 104/246, 248, 242, 243, 139, 140, 146, 118, 104/119, 120, 121; 105/72, 2; 191/45 R, 191/49, 23 R, 25, 29 R, 30; 16/96 R, 87 R, 16/87.4 R, 95 R, 94 R
See application file for complete search history.

(56) References Cited

U.S. PATENT DOCUMENTS

| 1,397,825 | A |   | 11/1921 | Thompson |   |
|---|---|---|---|---|---|
| 3,999,488 | A | * | 12/1976 | Monks | ............................ 105/30 |
| 5,704,295 | A | * | 1/1998 | Lohr | ............................ 105/72.2 |
| 5,758,583 | A |   | 6/1998 | Lohr |   |
| 6,755,136 | B2 | * | 6/2004 | Jenkins | .......................... 105/141 |
| 2005/0172851 | A1 | * | 8/2005 | Andre et al. | ................... 104/244 |

FOREIGN PATENT DOCUMENTS

| FR | 2 705 636 A1 | 12/1994 |
| FR | 2 780 739 A1 | 1/2000 |
| NL | 9058 | 10/1922 |

* cited by examiner

*Primary Examiner* — Mark Le
(74) *Attorney, Agent, or Firm* — Davis & Bujold, P.L.L.C.

(57) ABSTRACT

The invention relates to an anti-extraction safety device comprising, for each roller (13, 14), a rotatably fixed, preferably enveloping, shroud element (32, 33) forming a one-piece functional mechanical assembly with its counterpart. The base of the shroud elements has an extension (46, 47) which extends beneath the projecting flanks (21, 22) of the head of the guiding rail (19) in order to prevent any extraction of the guide assembly. At the front, the base of the shroud elements is preferably shaped as a lip for collecting and disposing of objects which may be present on the guiding track. The invention can be used for the rail guidance of road vehicles used for public transport.

12 Claims, 8 Drawing Sheets

ANTI-EXTRACTION SAFETY DEVICE FOR A GUIDANCE SET COMPRISING TWO INCLINED ROLLERS ROLLING ON A RAIL

This application is a National Stage completion of PCT/FR2007/002047 filed Dec. 12, 2007, which claims priority from French patent application serial no. 06-11296 filed Dec. 22, 2006.

FIELD OF THE INVENTION

This invention relates to an anti-extraction safety device for a guide assembly of a road vehicle guided by two inclined rollers rolling on a rail.

Advantageously, the safety device of the invention may also perform the function of removing objects that may be located on the guide track and that may interfere with the guiding of the vehicle.

The invention applies more specifically, but not exclusively, to urban public transport vehicles that are guided along a guide rail by means of a guide assembly comprising two guide rollers inclined to form a V shape.

BACKGROUND OF THE INVENTION

To ensure their guidance, guided urban public transport vehicles of this type have a guide assembly that permanently follows a continuous guide rail along the vehicle's entire route.

This guide assembly comprises V-shaped inclined rollers that roll on inclined tracks provided in the upper part of the head of the guide rail; this guide rail comprises a rail head with projecting flanks, under each of which a recess is located.

In order to ensure the safety of the vehicle and its passengers, it is essential that contact between the guide assembly, which is supported by the vehicle, and the guide rail—that is, between the guide rollers and the tracks on which they roll—be ensured at all times when the vehicle is moving.

To do this, the guide rollers are traditionally forced against the guide rail by an elastic return force, e.g., a spring arm.

While this type of system is adequate for normal guiding situations, exceptional situations exist wherein stress that is greater than the elastic stress may be exerted on the guide assembly in the opposite direction. This stress lifts the guide assembly above the guide rail and extracts it from the guide area. The guide rollers are pulled pull away from the guide rail, which possibly results in derailment.

This type of situation may occur, for example, when an object is located on the guide rail or inside the grooves running alongside the rail.

Indeed, because of exposure to bad weather and to the ambient environment of the guide track, it is common for the guide rail and/or its side grooves to be locally cluttered and/or obstructed with debris of all kinds—plants, ice, snow, rocks or other bodies or foreign objects left by accident or deliberately—that may constitute an obstacle for the guide rollers, causing them to be lifted up and off of the rail.

The lifting of the guide rollers and the extraction of the guide assembly out of the guide area of the rail represent unacceptable risks resulting in major problems, particularly the derailment of the guide assembly and subsequently of the vehicle.

To prevent the lifting and extraction of the guide assembly of these vehicles, according to the prior art, the guide rollers were equipped with flanges covering the outer face of the rollers and ending in a peripheral extension.

Traditionally, these flanges are part of or fixed to the guide rollers and turn with and at the same time as these rollers.

When the guide rollers are in operating position, each peripheral extension of the flanges fits into the lower recess of the guide rail, under the corresponding projecting flank of the rail head.

If the rollers experience lifting force, the peripheral extensions making up the flanges come up against the projecting flanks of the guide rail head and block the extraction of the guide assembly.

SUMMARY OF THE INVENTION

The purpose of the invention is to provide a novel anti-extraction safety device for the guide assembly, also called an anti-lifting device, that is more effective and more advantageous than the revolving flanges of the prior art.

To solve this technical problem, the invention provides an anti-extraction safety device for a guide assembly of a road vehicle comprising two inclined rollers rolling on inclined rolling tracks of the upper part of a guide rail head with projecting flanks, each of which is connected to the core of the rail through a recess.

According to the invention, each roller is protected by a rotatably fixed shroud element, with the combination of the two elements forming a shroud assembly whose base comprises an extension that extends, in operating position, under the corresponding projecting flank of the guide rail in order to oppose any extraction force exerted on the guide assembly.

These shroud elements may be independent or connected to each other in order to form a one-piece mechanical assembly that is made as a single unit or made by assembling the two shroud elements.

Contrary to the flanges of the prior art, the shroud elements do not turn with the guide rollers and are rotatably fixed.

The force needed to extract the guide assembly of the invention is much greater than the force that must be applied with rotating elements, such as the flange rollers of the prior art.

Indeed, with the device of the prior art, the flanges turn along with the guide rollers when the vehicle moves forward. When these flanges encounter an object inside the groove that runs alongside the rail, their rotation encourages the rollers to rise up on the rail by pressing on this object and the dynamic force that keeps the guide assembly from being pulled out is greatly decreased.

With the anti-extraction device of the invention, the extensions of the shroud elements do not turn and resistance to pull-out is the same both dynamically and statically. The dynamic resistance to pull-out of the anti-extraction device of the invention is therefore much improved over that of the device of the prior art.

Furthermore, in the traditional system consisting of rollers with flanges, the pull-out force passes through the bearings. To resist this force, these bearings must be very reliable and therefore must have the properties of safety pieces. These may be complex double tapered bearings, for example.

With the safety device of the invention, the pull-out force no longer passes through the bearings. As a result, they can be simpler and less expensive, e.g., simple ball bearings.

The shroud elements, since they are rotatably fixed, are no longer limited to a circular revolution shape. By giving them a different customized shape, they can thereby take on additional functions.

The shroud elements preferably have an enveloping shape that covers the outer faces of the guide rollers and, if desired, a part of their peripheral edge. In addition to their anti-extraction function, they may thus protect the rollers from objects that are projected and ejected while they are rolling.

According to a preferred embodiment of the invention, the front of the shroud elements base is shaped as a lip for lifting and removing objects present on the guide track.

Advantageously, the two shroud elements may be made in a single piece or mechanically joined to form a functional one-piece unit.

To do this, the lower lateral ends of each shroud element preferably extend towards each other to form a paired mechanical linkage with the corresponding shroud element of the opposite inclined roller.

It is advantageously possible to connect the shroud elements in an area situated near the rail in order to reinforce the resistance against spacing of their extensions. The pull-out resistance is greatly improved by doing this, because given the inclination of the faces resting on the rail, in order to improve pull-out resistance, one must—among other things—improve the spacing resistance of these extensions.

Additionally, it is possible to thicken these extensions locally in all available areas without involving the gauge of the rail grooves. These reinforcements also make it possible to improve the lateral flexion resistance of the extensions.

BRIEF DESCRIPTION OF THE DRAWINGS

Other features and advantages of the invention will emerge from reading the following detailed description that references the appended drawings, wherein.

DETAILED DESCRIPTION OF THE PREFERRED EMBODIMENTS

Figure 1:
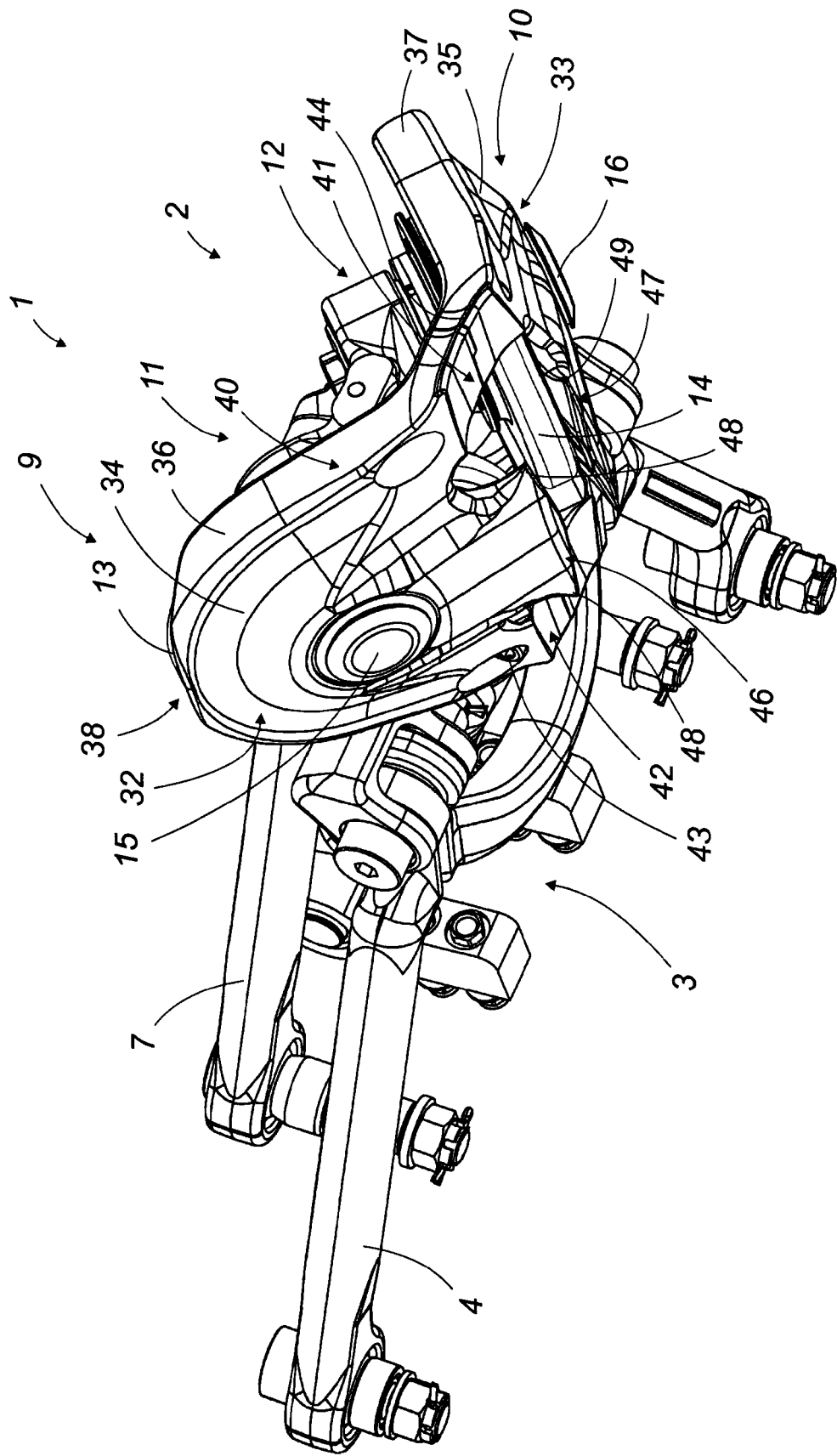
FIG. 1 is a front perspective view of an anti-extraction safety device of the invention mounted on a guide assembly with inclined rollers.
Figure 2:
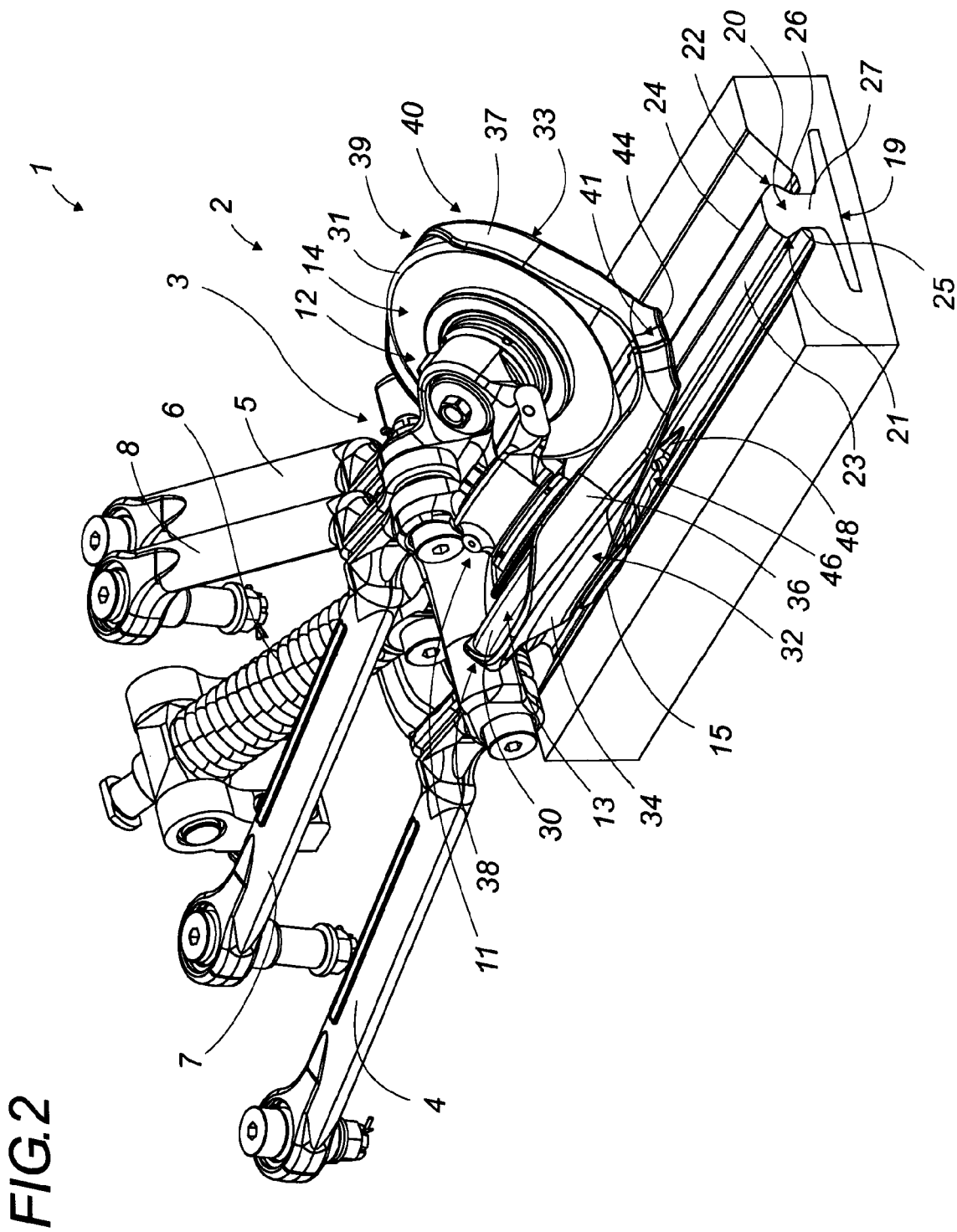
FIG. 2 is a front perspective view of an anti-extraction safety device of the invention, mounted on a guide assembly with inclined rollers engaged in a guide rail section.
Figure 3:
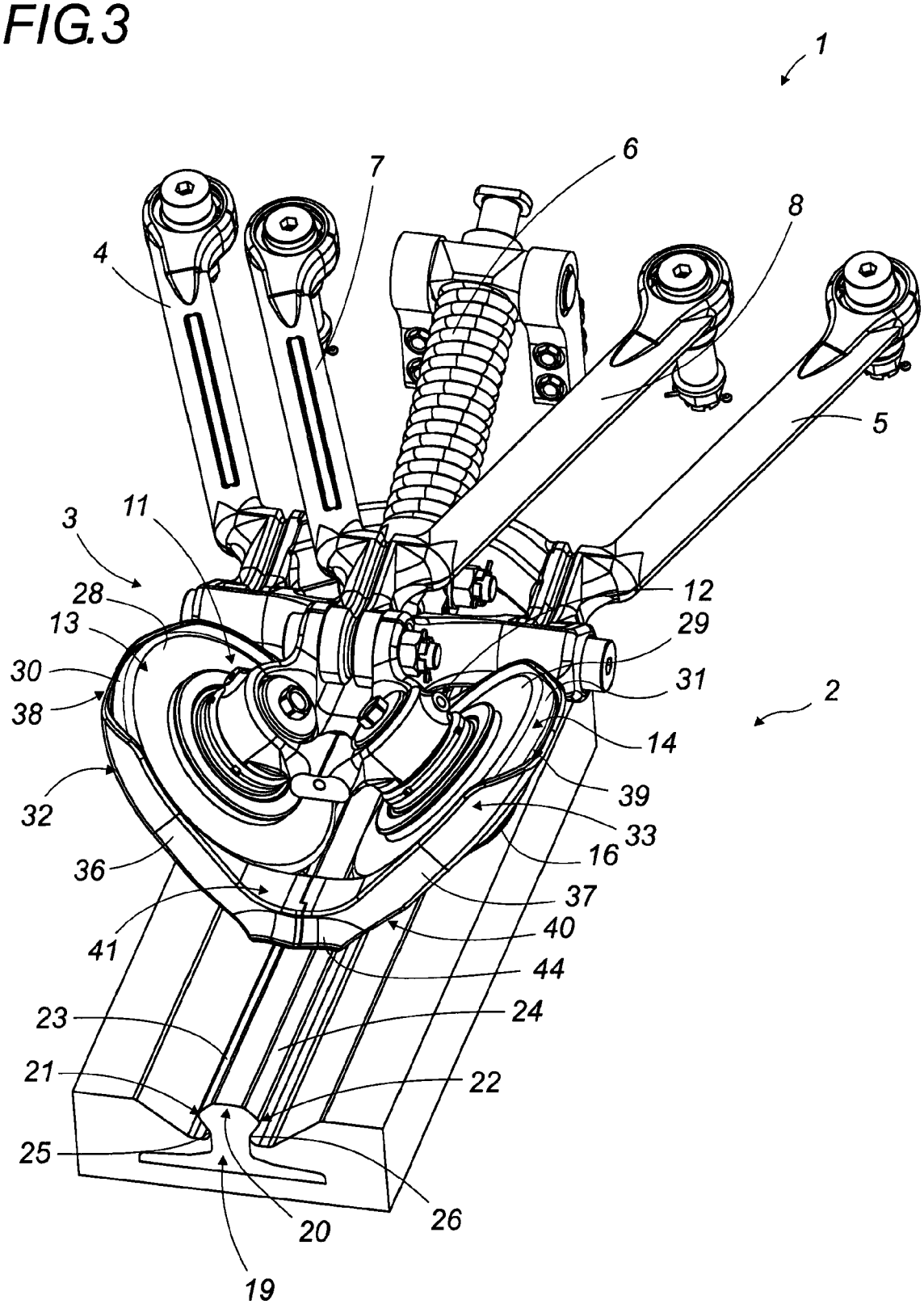
FIG. 3 is a top perspective view of an anti-extraction safety device of the invention, mounted on a guide assembly with inclined rollers engaged in a guide rail section.
Figure 4:
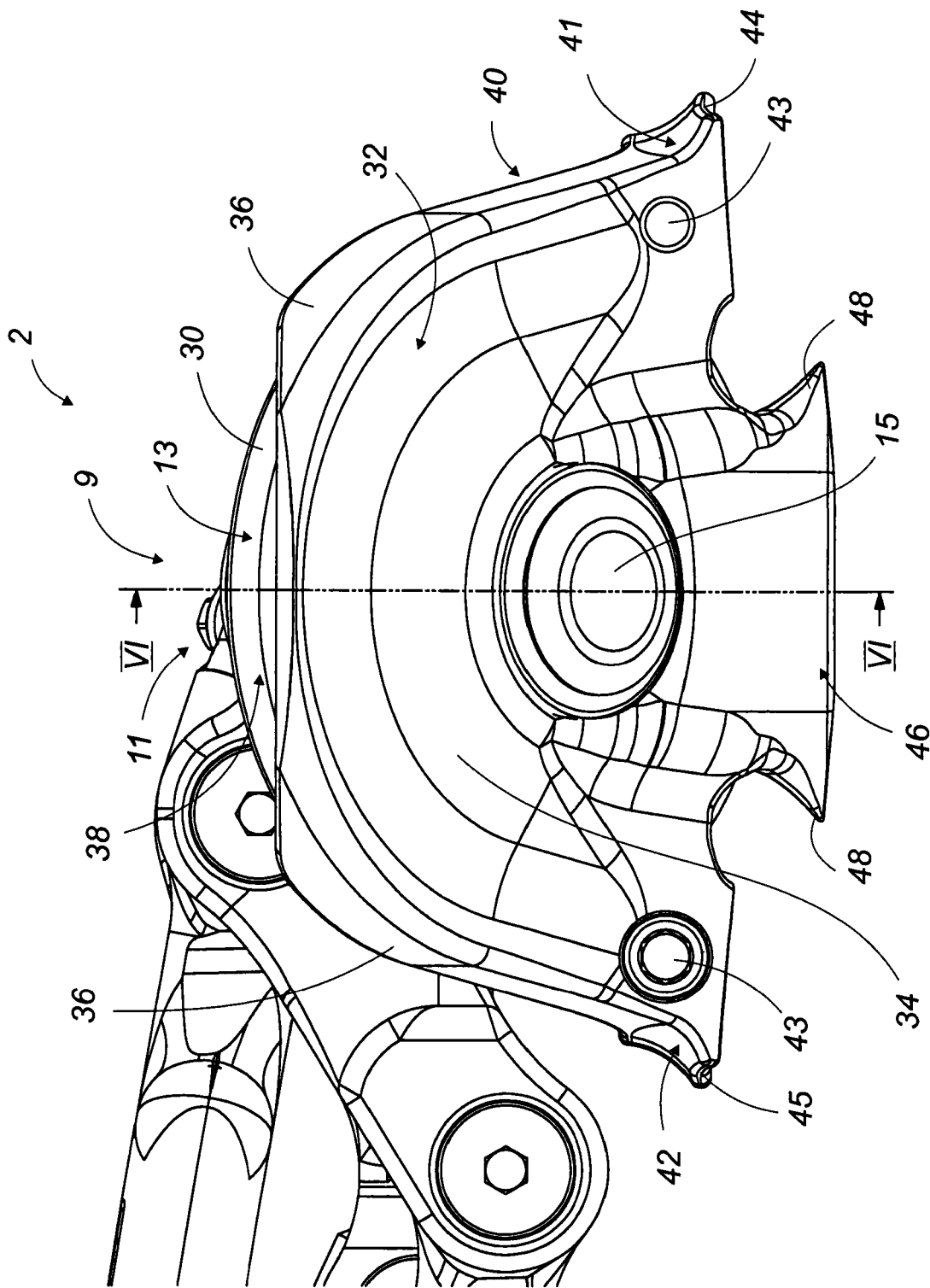
FIG. 4 is a side perspective view of an anti-extraction safety device of the invention.
Figure 5:
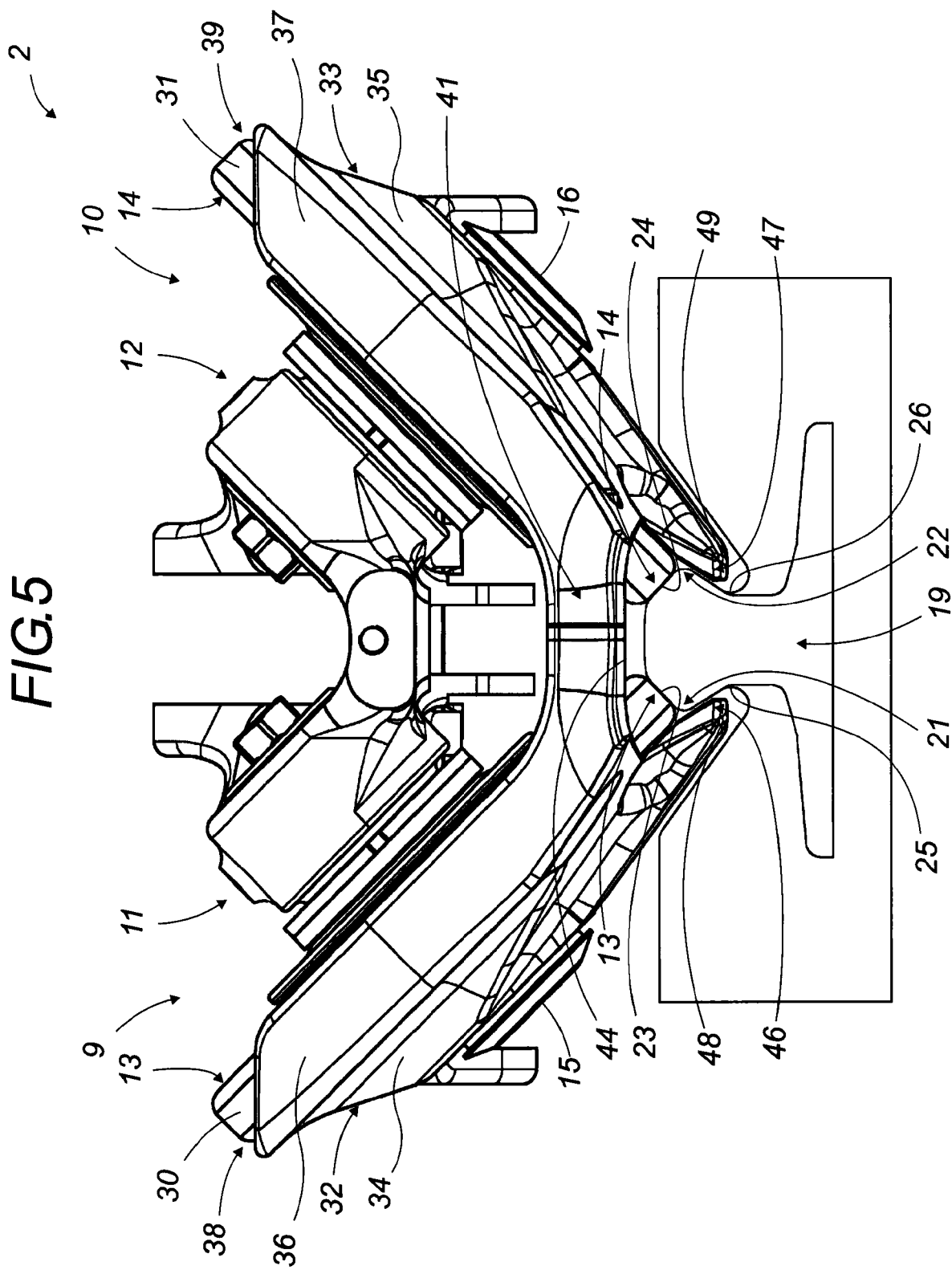
FIG. 5 is a front view of an anti-extraction safety device of the invention, mounted on a guide assembly with inclined rollers engaged in a guide rail section.
Figure 6:
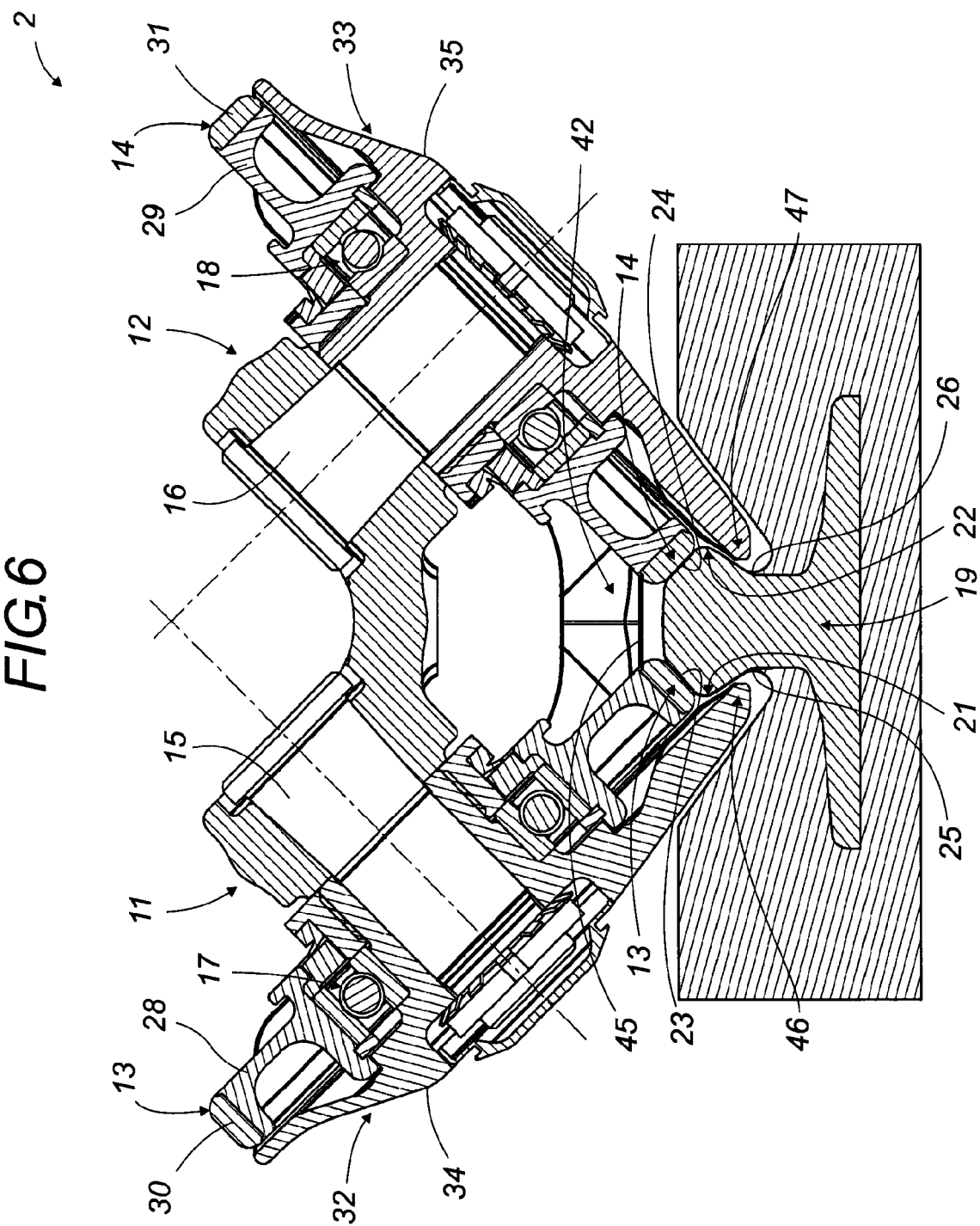
FIG. 6 is a cross-section view along the sectional plane VI-VI shown in FIG. 4 of an anti-extraction safety device of the invention mounted, on a guide assembly with inclined rollers engaged in a guide rail section.

The anti-extraction safety device of the invention will now be described in detail with reference to FIGS. 1 to 8. Equivalent parts shown in the various figures will have the same reference numbers.

In the remainder of this description, the concepts of up, down, lower and upper, etc. will be defined based on the orientation used in the various figures.

Likewise, front and rear will be defined based on the vehicle's direction of travel.

The safety device of the invention applies more specifically to a guide assembly 1 as shown in the figures.

It is composed of a guide head 2, mounted in an articulated fashion onto a swiveling support 3, which is borne by the vehicle via two swiveling arms 4 and 5 and an elastic connection 6, e.g., a spring. This moving element carries the guide head 2 like a gimbal joint using several swivel joints, as well as a restoring means carried out by two articulated arms 7 and 8.

Of course, this mechanical bearing and articulation assembly may be replaced by any equivalent or even different, but functionally equivalent assembly without affecting the inventive value of this invention.

According to the first variant of the invention shown in FIGS. 1 to 6, the guide head 2 is formed of two roller holder assemblies 9 and 10, each mounted independently on a support 11 and 12 whose swivel movements are checked at the end of a common cross-shaft by the pressure of a cotter nut.

The roller holder assemblies 9 and 10 are interconnected by slightly deformable mechanical linkages. They each hold a rotating inclined roller under bringing near elastic stress—13 and 14, respectively—via a spindle shaft 15, 16, onto each of which a bearing 17 and 18 is mounted, preferably a ball bearing.

This assembly constitutes the guiding device along a guide rail 19 of the type—as is shown in FIGS. 2, 3, and 5 to 8—that has a head 20 comprising two projecting flanks 21 and 22, each having in its upper part an inclined rolling track 23, 24 for rollers and a recess 25, 26 in its lower part, in the area where each projecting flank joins the core 27 of the rail.

The rollers are preferably rollers with light rim 28 and 29 and have a running tread 30 and 31 made of composite material.

Each of the guide rollers is surrounded by a shroud element 32, 33 that is rotationally fixed and joined to the corresponding spindle shaft 15, 16 in order to protect its roller and to ensure guide safety through an anti-extraction function.

Whatever their actual mechanical constitution may be, the shroud elements and the mechanical linkages between them form a functional unit called a shroud assembly for guide protection and anti-extraction safety.

The shroud elements preferentially cover, with a lateral protective wall 34, 35, the exposed outer face of the corresponding roller, and part of its peripheral edge by means of a peripheral flange 36, 37, if desired.

In order to enable visual checks of the condition of the running tread 30, 31 and of the rollers and to facilitate maintenance operations, the shroud elements 32, 33 may advantageously leave part of the peripheral edge of the rollers exposed, e.g., by means of an opening 38, 39 made in the upper part of their peripheral flange 36, 37. It is thereby possible to inspect the condition of the running tread 30, 31 of the guide rollers and the rollers themselves without having to remove the shroud elements.

The shroud elements 32, 33 may be mechanically independent in a base version.

For structural and mechanical resistance reasons, it appears preferable to make the two shroud elements in the form of an inseparable shroud unit 40 by providing a mechanical linkage between each shroud element.

Figure 7:
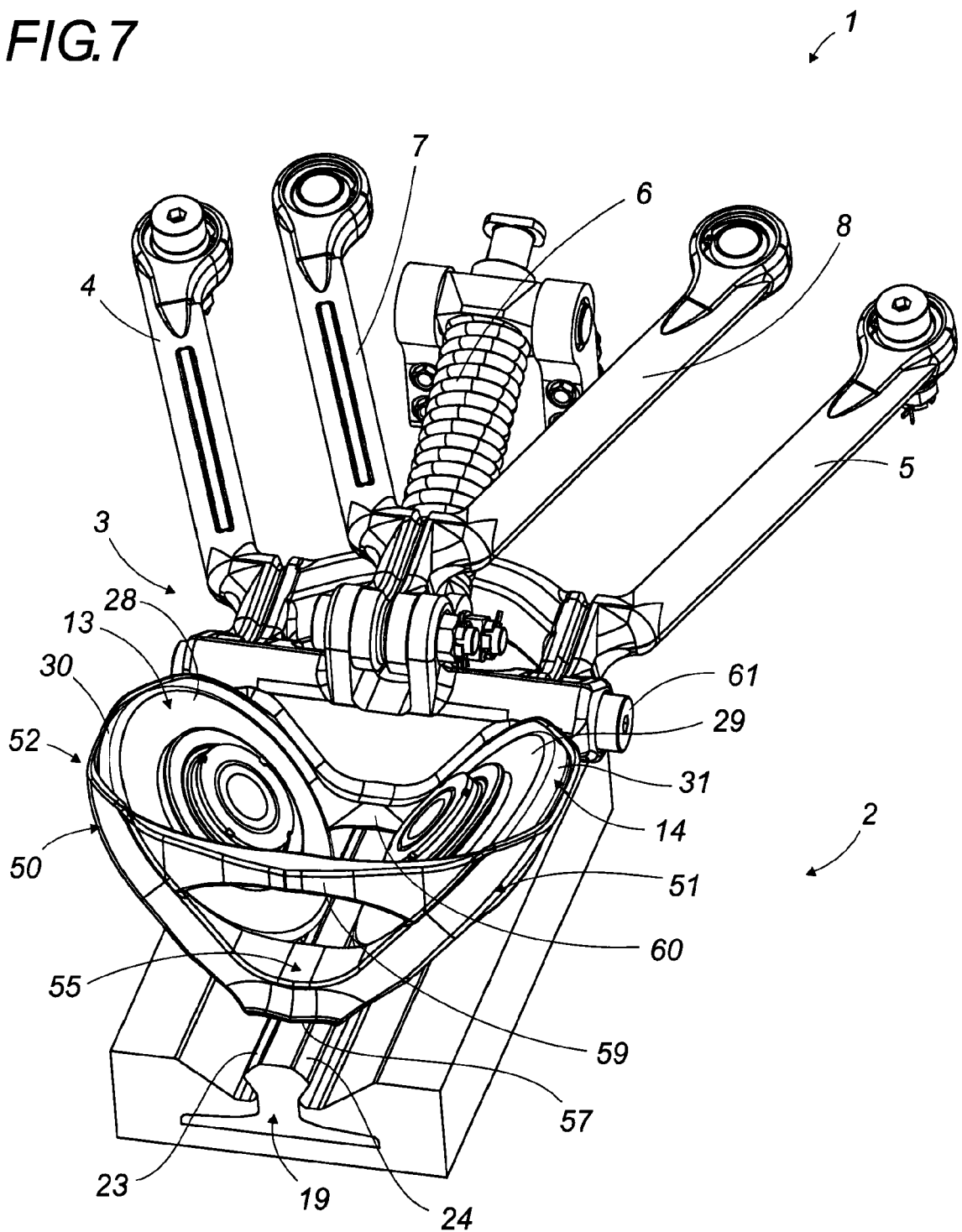
FIG. 7 is a top perspective view of a second one-piece variant of the anti-extraction safety device of the invention, mounted on a guide assembly with inclined rollers engaged in a guide rail section.
Figure 8:
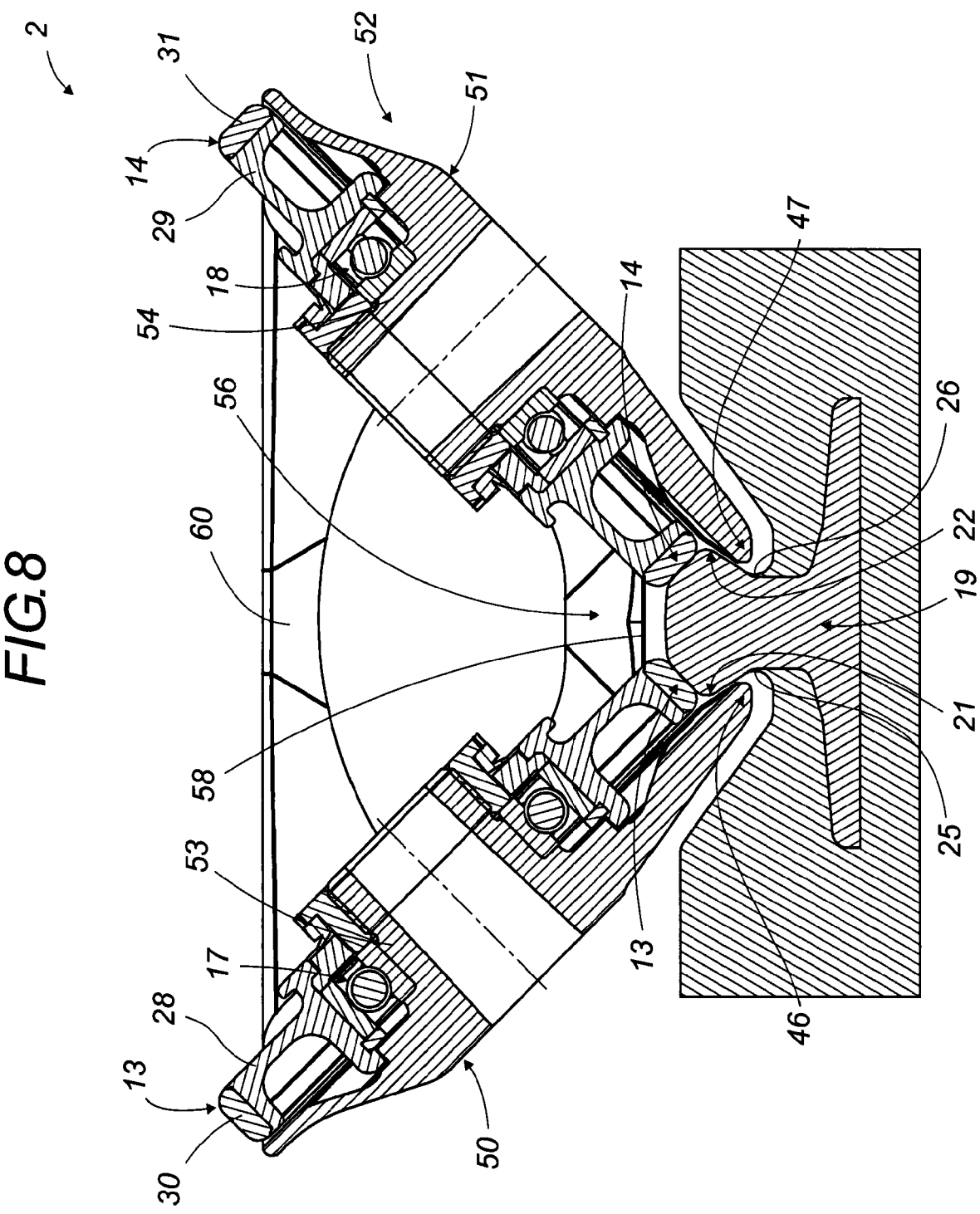
FIG. 8 is a cross section of the second one-piece variant of the anti-extraction safety device of the invention, mounted on a guide assembly with inclined rollers engaged in a guide rail section.

It is possible to produce the two shroud elements in a single piece. A realization example of this embodiment is shown in FIGS. 7 and 8 and will be described in greater detail hereinafter.

It is also possible, as shown in FIGS. 1 to 6, to connect mechanically two independent shroud elements 32, 33 during assembly.

These two shroud elements may advantageously be symmetrical so that only a single type of element needs to be produced.

The mechanical linkage may advantageously be positioned near the lower lateral ends of each of the shroud elements, which may preferably extend towards each other to form a paired mechanical linkage with the corresponding shroud element on the opposite inclined roller.

In the symmetrical version of the shroud elements, there are therefore two low mechanical linkages, a front one 41 and a rear one 42, e.g., assembled by means of screws such as 43, which are located slightly above the rail 19.

In addition to the basic mechanical function of the two shroud elements 32, 33, these linkages 41, 42, at least the front one 41, may make it possible to push away objects located on the guide rail 19 and to serve as wear or deterioration indicators for the rollers. Their shape is preferentially optimized to fulfill this function, with, more particularly, a lower edge, 44 and 45 respectively, which is raised to form a clearing spoiler.

According to the invention, the base of each shroud element 32, 33 has an extension 46, 47 that extends, in a guiding position of the rollers, under the corresponding projecting flank 21, 22 of the head 20 of the guide rail 19, up to the recess 25, 26 of the guide rail.

This position of the extension 46, 47 of the lower part of the two rotationally fixed shroud elements provides the desired anti-extraction and anti-pullout security.

The extension 46, 47 of the shroud elements, which is preferentially provided near the lower central part of each of the shroud elements, may advantageously perform another function. The front ends of these extensions 46, 47, or the front and rear ends in the symmetrical version, may advantageously be shaped into a lip 48, 49 to allow lifting and removal of any objects present inside the grooves of the guide rail, before they pass under the rollers, and whose size would present a hazard to the forward movement of the guide head.

A second embodiment of the invention is shown in FIGS. 7 and 8.

This is a one-piece variant with guide rollers bearing by means of shroud elements 50, 51 or of the mechanical assembly 52 formed by these shroud elements.

More specifically here, the shroud elements 50, 51 form a mechanical shroud assembly 52 generally shaped like a basket that supports the guide rollers 13, 14.

As can be seen in the cross-sectional view of FIG. 8, each shroud element 50, 51 is mounted on a spindle shaft and extends with a cylindrical projection 53, 54 in hollow cylinder shape.

Onto the outer periphery of each of these projections 53, 54, the cage for a ball bearing 17, 18—joined to the light-rim 28 or 29 for each guide roller 13, 14—is forcibly fitted. The turning assembly is axially immobilized by traditional means.

The shroud assembly 52 is formed of two opposed shroud elements 50, 51, each of which rotatably supports a guide roller 13, 14. The shroud elements 50, 51 are cross-linked by mechanical linkages or make up a single-piece mechanical shroud assembly.

Preferably, there are low front 55 and low rear 56 transversal linkages that rigidify the assembly against spacing and that may help to push away debris and objects by their lower edge, 57 and 58 respectively, being shaped like a spoiler.

These low cross-linkages are preferably complemented by upper reinforcing linkages, such as 59 in front and 60 in the rear.

In the rear, the shroud element assembly 52 is joined to the ends of a swiveling cross-shaft 61 that is elastically drawn downward and mounted onto a rear support 3 that is joined to guide arms 4 to 8.

Articulations needed for the swiveling displacement of the rear support 3 in relation to the elements are additionally provided in order to enable the assembly's guide orientation movements for following the curves of the guide rail path.

This variation confers additional advantages such as simple construction and improved roller extraction resistance.

Obviously, the invention is not limited to the preferred embodiments described above and shown in the various figures; a person skilled in the art may make many modifications thereto and develop other variants without exceeding either the scope or the framework of the invention.

The invention claimed is:

1. An anti-extraction safety device for a guide assembly (1) of a road vehicle, the anti-extraction safety device comprising:
   a pair of inclined rollers (13, 14) which roll along inclined rolling tracks (23, 24) of upper parts of a guide rail (19), the guide rail (19) having a head (20) with protruding flanks (21, 22), each of the pair of inclined rollers (13, 14) is rotationally supported on a respective spindle shaft (15, 16) which are non-rotatably fixed to the guide assembly (1), each of the protruding flanks (21, 22) extends from a respective side of a core (27) of the rail, a recess (25, 26) being formed between each of the protruding flanks (21, 22) and the respective side of the core (27),
   the pair of inclined rollers (13, 14) being protected by a shroud assembly that is non-rotatably fixed to the spindle shafts (15, 16), and
   a base of the shroud assembly comprises extensions (46, 47) each of the extensions (46, 47) extend under the corresponding protruding flank (21, 22) of the guide rail (19), when in operating position, thereby blocking any guide-assembly-extracting force, and the shroud assembly comprises a pair of protective walls (34, 35), each of the protective walls (34, 35) is independent from the other and each of the protective walls (34, 35) partially covers and protects a respective one of the inclined rollers (13, 14), the pair of protective walls (34, 35) are releasably coupled to each other by a front linkage (41), the front linkage (41) is located adjacent the head (20) of the guide rail (19) on a side of the shroud assembly opposite the road vehicle, the front linkage (41) is at an oblique angle with respect to the head (20) of the guide rail (19) and forms a cleaning spoiler to direct objects away from the guide rail (19).

2. An anti-extraction safety device for a road vehicle guide assembly (1) which is supported and guided by a guide rail (19) having a head (20) with two flanks (21, 22) that laterally protrude from the head (20) and each of the two flanks has an inclined rolling track (23, 24), the anti-extraction safety device comprises:
   two inclined rollers (13, 14), each of the two inclined rollers rolls along a respective one of the inclined rolling tracks (23, 24), each of the two inclined rollers (13, 14) being rotationally coupled to a support (11, 12) and at least partially housed by a shroud (32, 33), the shrouds (32, 33) being non-rotationally fixed with respect to the guide assembly (1), the shrouds (32, 33) each has a lower extension (46, 47) that extends into a respective recess (25, 26), the recesses (25, 26) being located on laterally opposite sides of the guide rail (19) below the head (20), the shrouds (32, 33) are coupled to each other such that the lower extensions (46, 47) secure the head (20) of the guide rail (19) between the fixed shrouds and prevent extraction of the guide assembly (1) from the guide rail (19), and lower lateral ends of the shrouds (32, 33) extend toward each other to form a paired mechanical linkage (41, 42) linking the shrouds; and the paired mechanical linkage (41,42) has a lower edge (44, 45, 57, 58) that is raised into a clearing spoiler shape that acts as at least one of a wear and a deterioration indicator for the rollers.

3. The anti-extraction safety device according to claim 2, wherein the shroud assembly comprises shroud elements (32, 33, 50, 51), each of the shroud elements (32, 33, 50, 51) protects a respective one of the pair of inclined rollers (13, 14), and each of the extensions (46, 47) extends from a respective one of the shroud elements (32, 33, 50, 51), under the corresponding protruding flank (21, 22) of the guide rail (19), when in the operating position, thereby blocking any guide-assembly-extracting force.

4. The anti-extraction safety device according to claim 3, wherein the shroud elements (50, 51) are a single piece and form a single-unit shroud assembly (52).

5. The anti-extraction safety device according to claim 3, wherein the shroud elements (32, 33) are mechanically joined to form a one-piece functional shroud assembly (40).

6. The anti-extraction safety device according to claim 3 wherein lower lateral ends of the shroud elements (32, 33, 50, 51) extend toward each other to form a paired mechanical linkage (41, 42, 55, 56) with the corresponding shroud element of the opposite inclined roller.

7. The anti-extraction safety device according to claim 3, wherein the shroud assembly (40, 52) rotatably carries the pair of inclined rollers (13, 14).

8. The anti-extraction safety device according to claim 7, wherein the base of the shroud assembly is shaped into a lip (48, 49) in front for lifting and removing objects that are located along the guide rail.

9. The anti-extraction safety device according to claim 8, wherein the shroud elements (32, 33, 50, 51) have an enveloping shape covering an outer face of the pair of inclined rollers (13, 14) and a portion of a peripheral edge of the pair of inclined rollers (13, 14).

10. An anti-extraction safety device for a guide assembly (1) of a road vehicle, the anti-extraction safety device comprising:

a pair of inclined rollers (13, 14) which roll along inclined rolling tracks (23, 24) of upper parts of a guide rail (19), the guide rail (19) having a head (20) with protruding flanks (21, 22), each of the protruding flanks (21, 22) extends from a respective side of a core (27) of the rail, a recess (25, 26) being formed between each of the protruding flanks (21, 22) and the respective side of the core (27), the pair of inclined rollers (13, 14) being protected by a rotationally fixed shroud assembly, and a base of the shroud assembly comprises an extension (46, 47) that extends under the corresponding protruding flank (21, 22) of the guide rail (19), when in operating position, thereby blocking any guide-assembly-extracting force;

lower lateral ends of the shroud elements (32, 33, 50, 51) extend toward each other to form a paired mechanical linkage (41, 42, 55, 56) linking the shroud elements; and the paired mechanical linkage (41, 42, 55, 56) has a lower edge (44, 45, 57, 58) that is raised into a clearing spoiler shape that acts as at least one of a wear and a deterioration indicator for the pair of rollers.

11. An anti-extraction safety device for a guide assembly (1) of a road vehicle, the anti-extraction safety device comprising:

a pair of inclined rollers (13, 14) which roll along inclined rolling tracks (23, 24) of upper parts of a guide rail (19), the guide rail (19) having a head (20) with protruding flanks (21, 22), each of the pair of inclined rollers (13, 14) is rotationally supported on a respective spindle shaft (15, 16) which are non-rotatably fixed to the guide assembly (1), each of the protruding flanks (21, 22) extends from a respective side of a core (27) of the rail, a recess (25, 26) being formed between each of the protruding flanks (21, 22) and the respective side of the core (27), the pair of inclined rollers (13, 14) being protected by a shroud assembly that is non-rotatably fixed to the spindle shaft (15, 16), a base of the shroud assembly comprises extensions (46, 47), each of the extensions (46, 47) extend under the corresponding protruding flank (21, 22) of the guide rail (19), when in operating position, thereby blocking any guide-assembly-extracting force, and the base of the shroud assembly is shaped into a lip (48, 49) in front for lifting and removing objects that are located along the guide rail the shroud assembly comprises shroud elements (32, 33, 50, 51), each of the shroud elements (32, 33, 50, 51) protects a respective one of the pair of inclined rollers (13, 14) and each of the extensions (46, 47) extends from a respective one of the shroud elements (32, 33, 50, 51), under the corresponding protruding flank (21, 22) of the guide rail (19), when in the operating position, thereby blocking any guide-assembly-extracting force, and the shroud elements (32, 33, 50, 51) have an opening (38, 39) in an upper part that exposes part of the pair of inclined rollers (13, 14) and running tread (30, 31) of the pair of inclined rollers (13, 14).

12. An anti-extraction safety device for a guide assembly (1) of a road vehicle, the anti-extraction safety device comprising:

a pair of inclined rollers (13, 14) which roll along inclined rolling tracks (23, 24) of upper parts of a guide rail (19), the guide rail (19) having a head (20) with protruding flanks (21, 22), each of the pair of inclined rollers (13, 14) is rotationally supported on a respective spindle shaft (15, 16) which are non-rotatably fixed to the guide assembly (1), each of the protruding flanks (21, 22) extends from a respective side of a core (27) of the rail, a recess (25, 26) being formed between each of the protruding flanks (21, 22) and the respective side of the core (27), the pair of inclined rollers (13, 14) being protected by a shroud assembly that is non-rotatably fixed to the spindle shaft (15, 16), a base of the shroud assembly comprises extensions (46, 47), each of the extensions (46, 47) extend under the corresponding protruding flank (21, 22) of the guide rail (19), when in operating position, thereby blocking any guide-assembly-extracting force, and the shroud assembly comprises a peripheral flange (36, 37) which covers and protects peripheral surfaces of the inclined rollers (13, 14), the peripheral flange (36, 37) comprises lower openings, which expose portions of the peripheral surfaces of the inclined rollers (13, 14) and facilitate contact between the peripheral surfaces of the inclined rollers (13, 14) and the rolling tracks (23, 24), upper openings (38, 39) of the peripheral flange (36, 37) expose other portions of the peripheral surfaces of the inclined rollers (13, 14) to facilitate inspection of the peripheral surfaces of the inclined rollers (13, 14).

\* \* \* \* \*